United States Patent [19]

Hanabusa et al.

[11] Patent Number: 4,761,742
[45] Date of Patent: Aug. 2, 1988

[54] GUIDING SPOT DISPLAY APPARATUS

[75] Inventors: Kazunori Hanabusa, Kasugai; Nobutoshi Yamagishi, Obu; Kenzo Ito, Okazaki, all of Japan

[73] Assignee: Nippondenso Co., Ltd., Kariya, Japan

[21] Appl. No.: 856,157

[22] Filed: Apr. 25, 1986

[30] Foreign Application Priority Data

Apr. 26, 1985 [JP] Japan ............................. 60-91486

[51] Int. Cl.$^4$ .................. G06F 15/20; G09B 29/10
[52] U.S. Cl. ............................. 364/443; 364/449; 340/988; 340/995
[58] Field of Search ............ 364/424, 443, 449, 460, 364/521, 522; 73/178 R; 340/988, 990, 995; 342/450–452

[56] References Cited

U.S. PATENT DOCUMENTS

| | | | |
|---|---|---|---|
| 3,618,240 | 11/1971 | Pelin | 340/995 |
| 4,086,632 | 4/1978 | Lions | 340/995 |
| 4,312,577 | 1/1982 | Fitzgerald | 364/444 |
| 4,504,913 | 3/1985 | Miura et al. | 73/178 R |
| 4,511,973 | 4/1985 | Miura et al. | 340/955 |
| 4,513,377 | 4/1985 | Hasebe et al. | 340/990 |
| 4,514,810 | 4/1985 | Ito et al. | 340/990 |
| 4,527,155 | 7/1985 | Yamaki et al. | 340/995 |
| 4,532,514 | 7/1985 | Hatano et al. | 364/460 |
| 4,535,335 | 8/1985 | Tagami et al. | 340/988 |
| 4,543,572 | 9/1985 | Tanaka et al. | 364/449 |
| 4,550,315 | 10/1985 | Bass et al. | 364/522 |
| 4,571,684 | 2/1986 | Takanabe et al. | 340/995 |
| 4,646,089 | 2/1987 | Takanabe et al. | 340/988 |

FOREIGN PATENT DOCUMENTS

| | | | |
|---|---|---|---|
| 0066877 | 12/1982 | European Pat. Off. | |
| 0118886 | 9/1984 | European Pat. Off. | 364/424 |
| 2100001 | 12/1982 | United Kingdom . | |

Primary Examiner—Gary Chin
Attorney, Agent, or Firm—Cushman, Darby & Cushman

[57] ABSTRACT

A guiding spot display apparatus displays a number of guiding spots for providing various guiding information on a road map. The apparatus includes a storage medium for storing a plurality of guiding spot data each being assigned a plurality of priorities and corresponding to one of a plurality of guiding classifications, a display selecting device for generating a display signal indicative of the classification of the guiding spots to be displayed, a control unit responsive to the selection signal to successively input from the storage medium the corresponding guiding spot data starting from the one having the highest priority and generate a display signal for displaying the data, and a display responsive to the display signal to display the selected guiding spots on the road map. Thus, the degree of the freedom in the display of guiding spots is improved and the apparatus is well suited for use in a wide range of guiding information application.

5 Claims, 6 Drawing Sheets

GUIDING SPOT DISPLAY APPARATUS

BACKGROUND OF THE INVENTION

1. Field of the Invention

The present invention relates to a guiding spot display apparatus and more particularly to guiding spot display apparatus of a type well suited for use as a vehicle's travel guide as well as any of various other guides (e.g., tourist guide, shopping street guide and public facilities guide).

2. Description of the Prior Art

Included among known guiding apparatus of this type is a map display apparatus disclosed in Japanese Patent Unexamined Publication No. 59-164583 (U.S. Ser. No. 587,655) which is installed in a vehicle to direct its course or movement.

This map display apparatus includes a map data storage medium preliminarily storing level information established in consideration of the display form of maps to be displayed on the screen of a display, e.g., the reduced scale and density.

However, this type display apparatus including a map data storage medium storing level information is disadvantageous in that if a greater number of guiding spots are preset in an attempt to provide a more substantial guide, simply providing each map display form with the corresponding display level causes the guiding spots automatically displayed on the display screen to become excessively dense or sparse for the same display form depending on each area thus failing to provide a satisfactory guide.

SUMMARY OF THE INVENTION

With a view to overcoming the foregoing deficiencies of the prior art display apparatus, it is an object of the present invention to provide an improved guiding spot display apparatus so designed that priority is allocated between the various guiding spots of each guiding spot group and the guiding spots are selectively displayed on the basis of the priority order as the occasion demands, thereby displaying the guiding spots in order of priority or in order of importance.

To accomplish the above object, in accordance with the invention there is thus provided a guiding spot display apparatus including operating means responsive to an operation for selecting and displaying a guiding spot group of a desired class to generate a guiding spot select and display command signal, a storage medium storing a group of guiding spot information to which different priorities are allocated, display control means for receiving the guiding spot select and display command signal from the control means to input at least one of the information in the guiding spot information group and generate a display signal for displaying on display means the guiding spots starting from the one having the highest priority, and the display means for receiving the display signal to display the corresponding group of guiding spots.

The storage medium may be a magnetic tape, a magnetic disc or a CD ROM. The storage medium stores the group of guiding spot information arranged in the sequence in which they are to be read in the order of priority or it stores the guiding spot information in pairs with the corresponding priority indicative information.

With the construction described above, the guiding spot display apparatus is advantageous in that if the apparatus is used for example to provide a vehicle's travel guide and a vehicle occupant gives a command for displaying on the display screen the guiding spots of the desired class as marks for guiding the travel of the vehicle, a desired number of the guiding spots having the high priorities are displayed thus providing the desired travel guide with a high degree of freedom.

DESCRIPTION OF THE PREFERRED EMBODIMENTS

Figure 1:
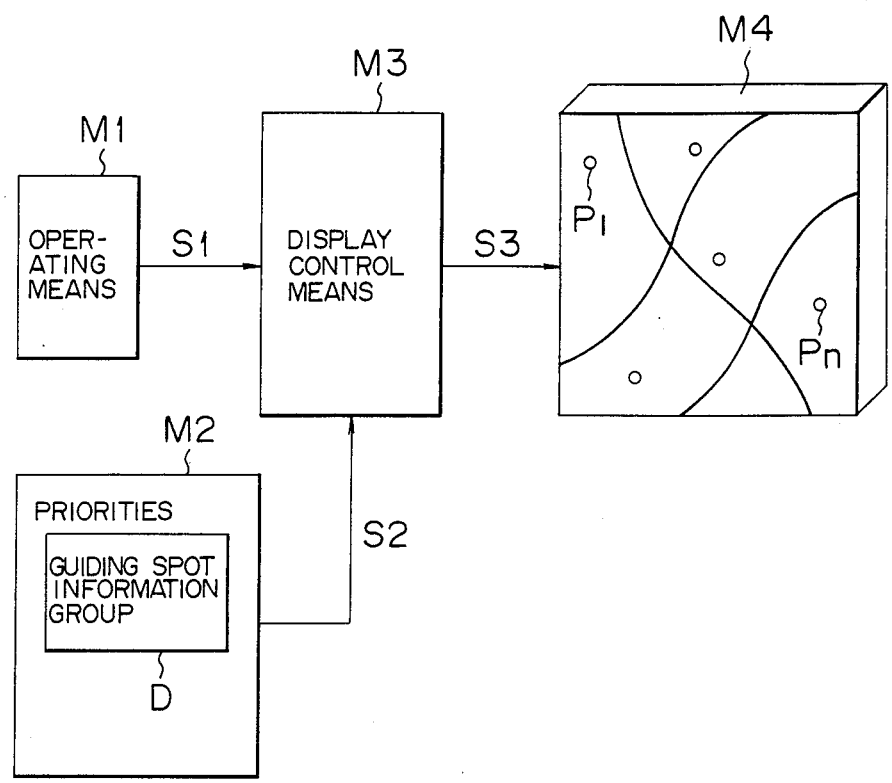
FIG. 1 is a block diagram showing the construction of the present invention.
Figure 2:
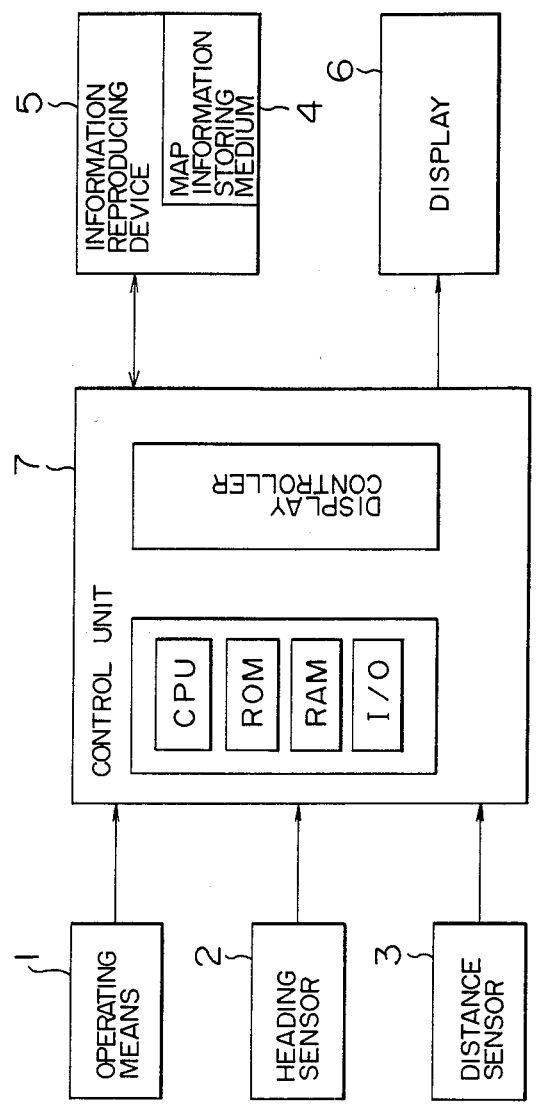
FIG. 2 is a block diagram showing the construction of a guiding spot display apparatus according to the invention which is used as a travel guide installed in a vehicle.

Referring to FIG. 2, the construction of a guiding spot display apparatus is illustrated according to an embodiment of the invention, and which is adapted for guiding the movement of a vehicle.

The apparatus uses the vehicle battery as its power source and it is placed in condition for operation by the operation of a main switch which is not shown. With this apparatus, when the vehicle occupant gives a map display command, by using operating means 1 or a control unit 7, a forming display control means generates a map display updating command in response to the travel of the vehicle. The control unit 7, then sitably drives an information reproducing unit 5 so that the desired map information is fetched from a map information storage medium 4 and processed suitably in the control unit 7. The desired map is then displayed on the display means-e.g. the screen of a display 6.

The apparatus also computes the present position of the vehicle in accordance with the heading signal from a known heading sensor 2 and the distance signal from a known distance sensor 3 so that the computed present position is corrected as needed and then displayed as a present position mark on the map displayed on the display screen.

Figure 3:
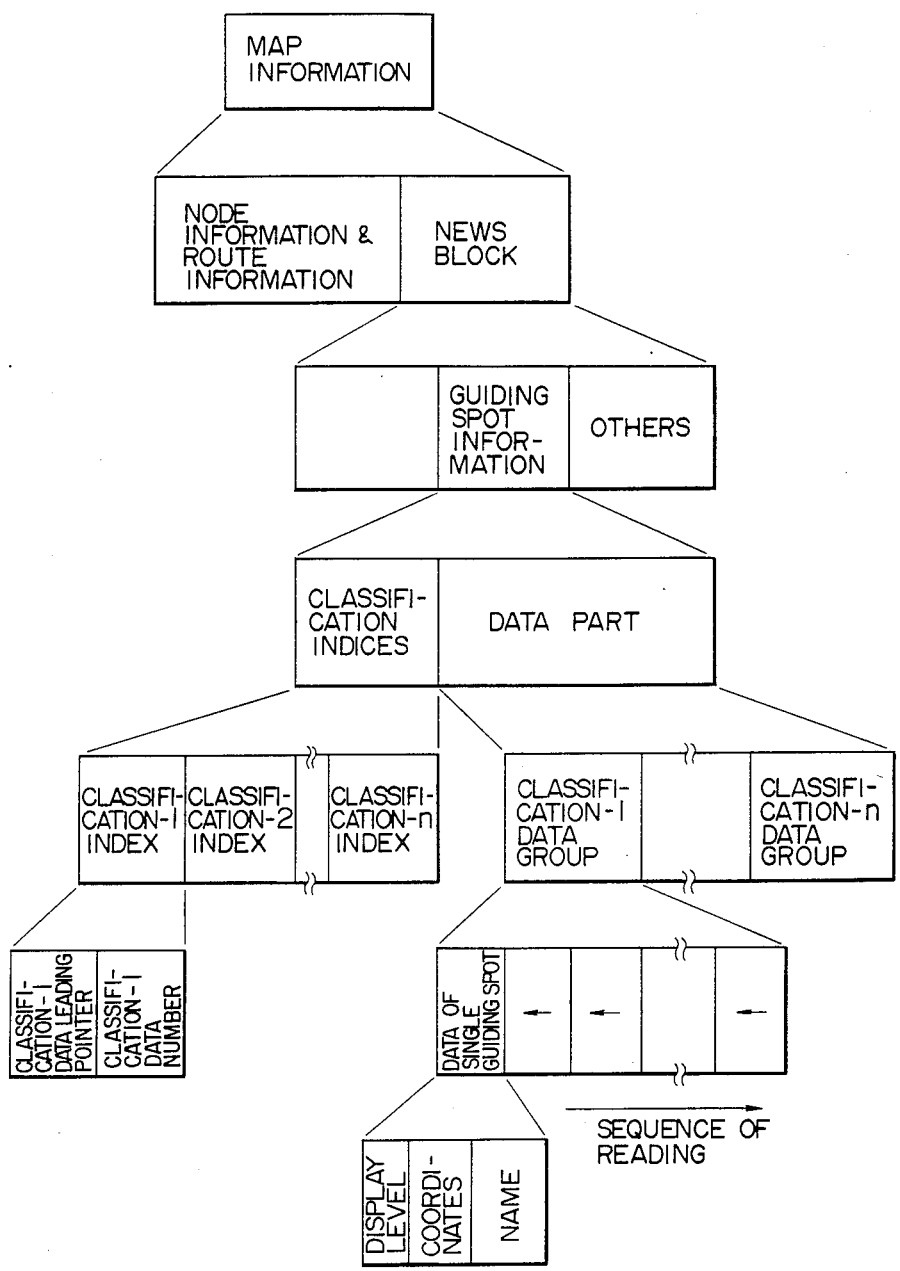
FIG. 3 is a diagram showing a data structure of the map information storage medium of FIG. 2.
Figure 4:
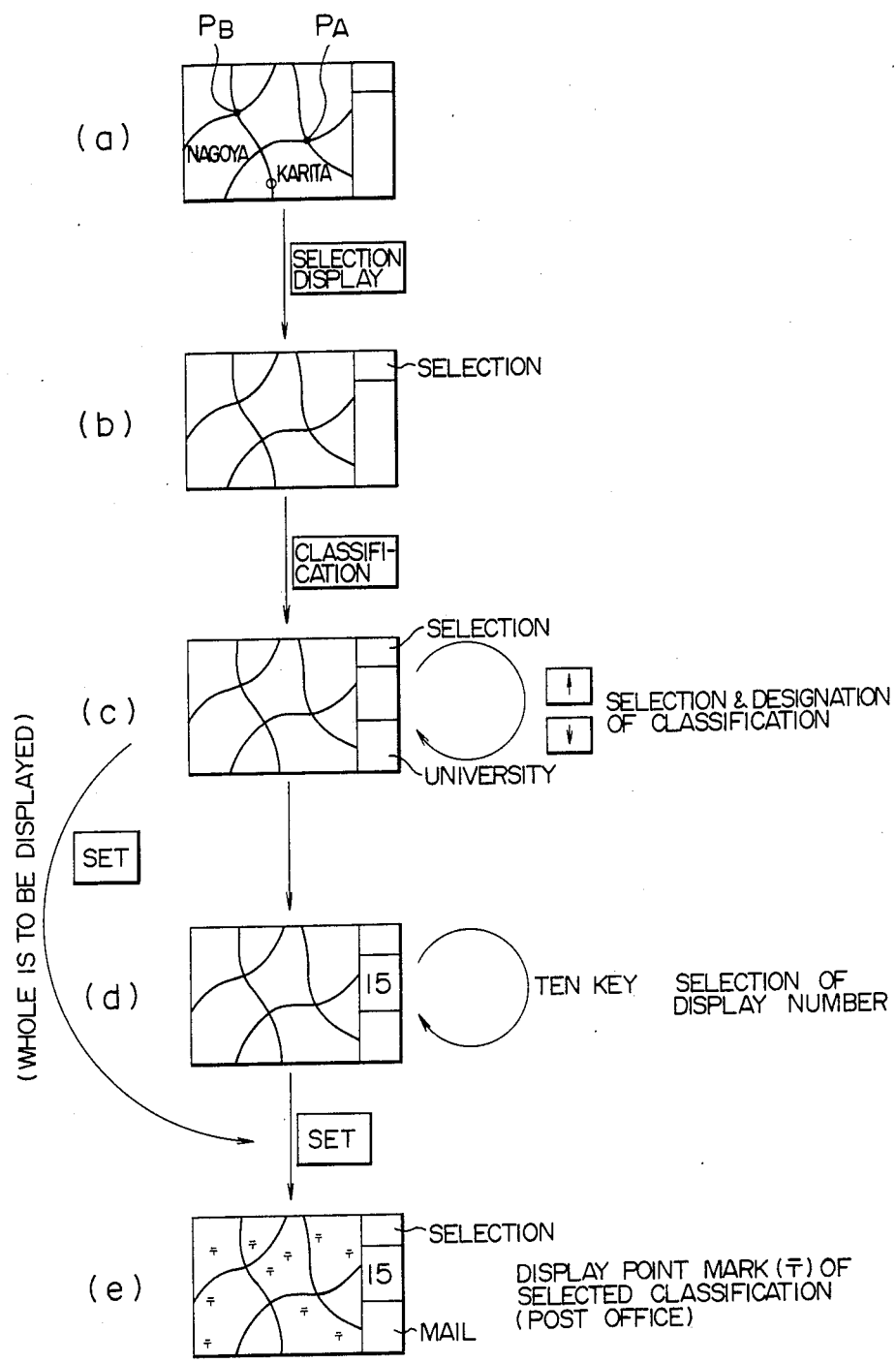
FIG. 4 shows the manner in which the display pattern on the display screen is changed successively.

The map information storage medium 4 has a stored data structure as shown in FIG. 3. In other words, the map data stored in the storage medium 4 includes node information, route information and a news block which respectively correspond to the spot information string, route information string and news information string shown in Japanese Patent Unexamined Publication No. 59-164583. The news block includes guiding spot information. The guiding spot information includes classification indices and a data portion and the classification indices include a classification-1 index, classification-2 index, - - - , classification n index which respectively correspond to classifications 1 to n. Also, the data portion includes a classification-1 data group, classification-2 data group, - - - , classification-n data group. The classifications 1, 2, - - - , n respectively correspond to classifications of the guiding spots into groups such as universities, parks, post offices, etc. Each classification index includes a leading pointer representing the leading address of the storage area storing the corresponding data group and a data number representing the number of data in the data group or the number of guiding spots. Each of the classification data groups is arranged and stored in the order of priority in a corresponding one of the storage locations. This prioritizing is effected by an arrangement of the order in which the stored information are read such that higher priority data is read first. The data for each guiding spot or guiding spot information includes a combination of guiding spot display level information assigned in accordance with the display form of a displayed map, e.g., the reduced scale and density, the coordinate information of the guiding spot with respect to a specific point such as a point $P_A$ or $P_B$ in (a) of FIG. 4 and name information of the guiding spot.

Figure 6:
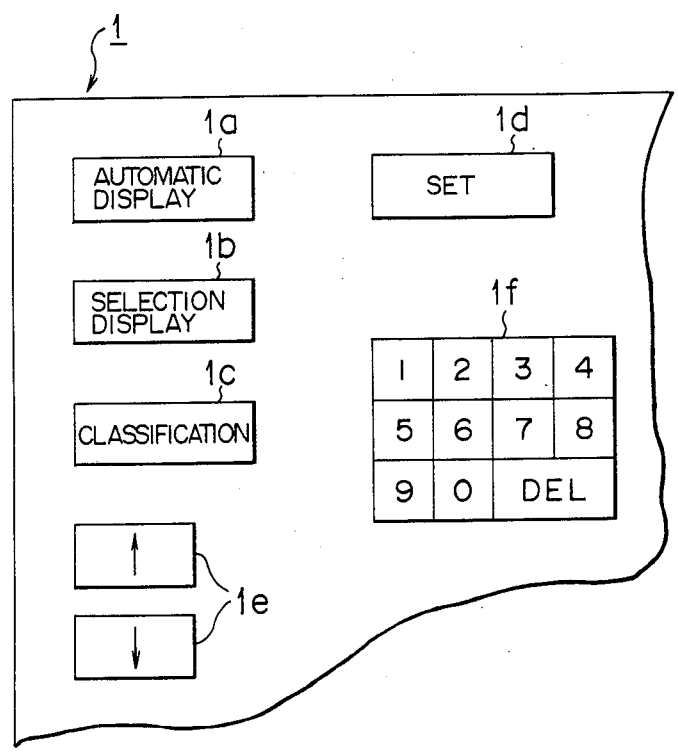
FIG. 6 shows the arrangement of the keys on the operating means.

The map can be viewed in an automatic display mode or a mode in which the present position of the vehicle is computed and displayed in superposition on the map. The displayed map is automatically updated for display (e.g., the pattern shown in (a) of FIG. 4 corresponds to this display pattern on the display 6). The selection display command key of the operating means 1 (shown at 1b in FIG. 6 showing the arrangement of the keys on the operating means 1) is used to change the displayed character in the upper right corner of the display screen from "automatic" to "selection" (this corresponds to (b) of FIG. 4). The classification key (shown at 1c in FIG. 6) is then operated, thereby displaying a character representing the classification in the lower right corner of the map on the display screen. For instance, as shown in (c) of FIG. 4, the classification 1 will display "university". If the guiding spot requested by the vehicle occupant is not a university, the cursor key for directing the selection and commanding of the classification of the desired guiding spots can be suitably operated until the lower right corner of the map displays the desired character, e.g., "mail". This character represents the desired guiding spots of the vehicle occupant. When this occurs, the numeric keyboard 1f in FIG. 6 is operated to input the desired guiding spot number. The number (e.g., 15) thus inputted by the operation of numeric keyboard if is displayed in the form of a figure in the middle right side of the display screen as shown in (d) of FIG. 4. While the displays to be made on the display in response to these operations are controlled by the control unit 7, this control has no direct bearing on the invention and thus the related processing and operations will not be described.

After the above-mentioned display number selecting operation has been completed set key 1d in FIG. 6 can be operated to command the control unit 7 to perform the following processing so that of all the post offices (corresponding to the selected classification, "mail") belonging to the displayed map are displayed. Since fifteen has been chosen as the desired guiding spot number, locations of the fifteen offices selected according to the priority order are to be displayed. These locations are displayed by means of point marks "╤" superposed on the displayed map as shown in (e) of FIG. 4.

Figure 5:
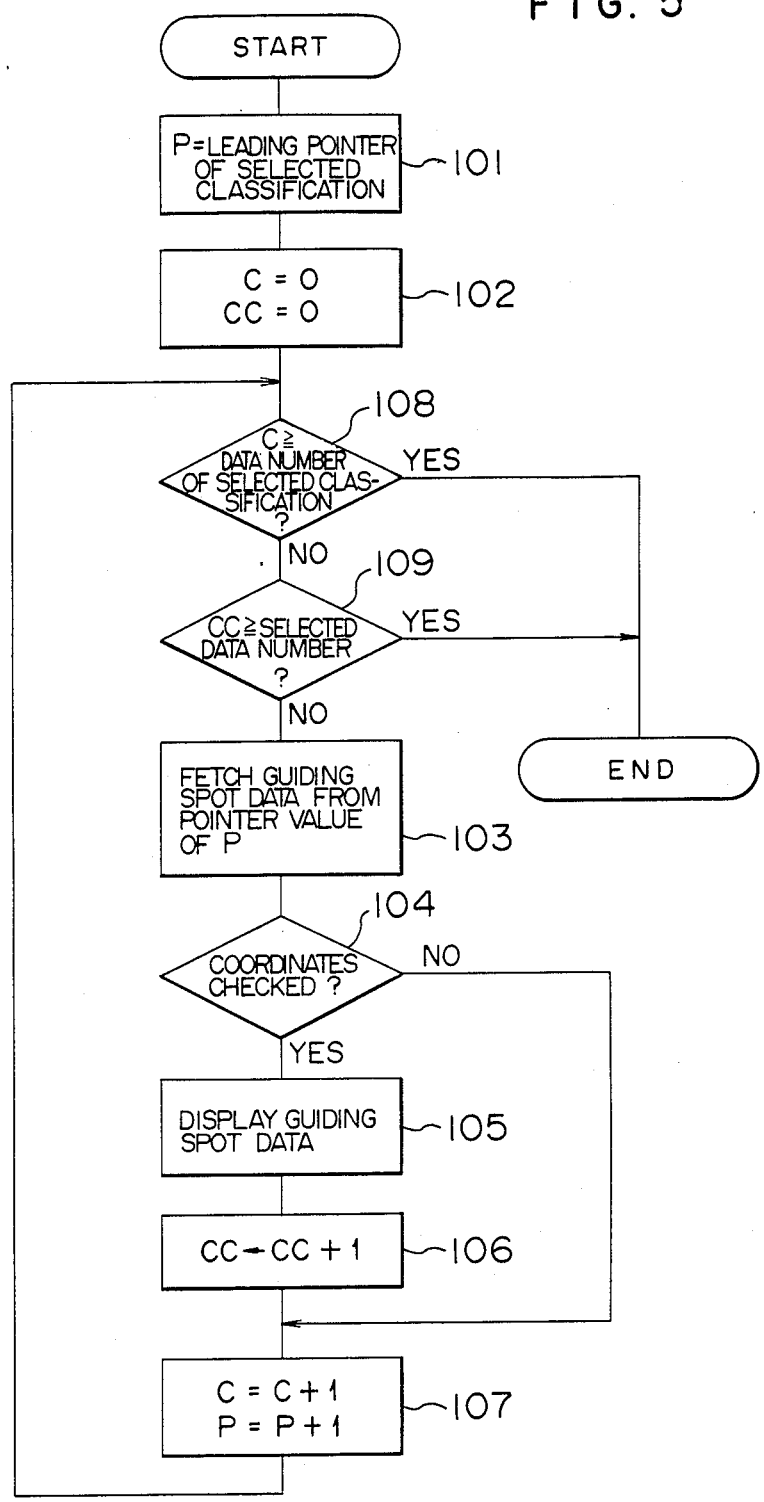
FIG. 5 is a flow chart showing the principal processing steps of the display control means.

The processing is shown in FIG. 5, beginning at a step 101 where the leading pointer of the classification selected by the classification selecting operation is fetched from the map information storage medium 4 through the information reproducing unit 5. A required initialization, including the setting of counters C and CC, is effected at a step 102. Tests are then made at steps 108 and 109 to determine if C and CC are correct.

Then, at a step 103, the storage location of the map information storage medium 4 designated by the leading pointer is accessed and the single guiding spot information stored in this storage location is fetched.

At a step 104, the coordinate information included in the thus fetched guiding spot information and the coordinate information indicating the area of the displayed map is checked. This coordinate information includes for example the coordinates of the four corner points on the displayed map with respect to the display screen which is stored at a given address of the RAM when the map is displayed or the display is updated. Based on this data, a decision is made as to whether this guiding spot is located within the displayed map.

If it is determined that the guiding spot is located within the displayed map, at a step 105, a point mark "╤" is displayed in superposition at the position corresponding to the guiding spot on the displayed map on the display screen and the value of the counter CC is incremented by 1 at step 106.

On the contrary, if it is determined that the guiding spot is not located within the displayed map, no point mark display and no updating of the counter CC are effected.

Then, at a step 107, the value of the counter C is incremented by 1 and also the contents of the pointer is updated to indicate the guiding spot information storage location of the next guiding spot to the current guiding spot.

The same processing as the above-mentioned steps 103 to 107 as a cycle is performed successively for each of the post offices on the map information storage medium 4 in the order of priority or in the sequence in which they are to be read out, until the content of the counter CC attains the specified number of data. According to the previous example, "15" post offices are to be displayed.

When it is determined that the contents of the counter C is equal to the stored data number (shown in FIG. 3) of desired classification at a step 108 or when it is determined that the content of the counter CC is equal to the desired number of data at a step 109, the processing is completed.

It is to be noted that if the classification selecting operation is followed directly by a setting operation without any number of display setting operation, all the displayable post offices within the displayed map are displayed in accordance with the display level information.

While, in the embodiment described above, the allocation of priorities is effected by arranging and storing guiding spot information in the map information storage medium in the sequence in which it is to be read out, it is also possible to separately provide priority indicative information and store this information and the guiding spot information in pairs in the map information storage medium. Also, while each map is displayed on the basis of the coordinate information of the spots forming the map, the map configuration may be given in the form of a two-dimensional pattern data.

From the foregoing description it will be seen that in accordance with the present invention, by virtue of the allocation of priorities to guiding spot information, there is the effect of increasing a degree of freedom for the display of guiding spots and making the apparatus of the invention well suited for use in a wide range of guiding applications.

We claim:

1. An apparatus for displaying a plurality of guiding spots on a road map, comprising:
   display means for displaying a map of a predetermined area;
   storage means for storing first guiding spot data corresponding to a first guiding classification, each of said first guiding spot data being assigned a priority, and for storing second guiding spot data corresponding to a second guiding classification, each of said second guiding spot data being assigned a priority;
   classification selecting means for selecting one of said first guiding classification and said second guiding classification;
   designating means for entering a designation related to the number of guiding spots to be displayed; and
   display control means for reading guiding spot data from said storage means corresponding to the guiding classification selected by said classification selecting means and for displaying said guiding spots in accordance with said guiding spot data on said map displayed by said display means, a number of guiding spots displayed corresponding to said designation by said designating means, said guiding spots being displayed in order of priority such that a higher priority guiding spot is displayed before a lower priority guiding spot.

2. An apparatus according to claim 1, wherein said first and second guiding spot data comprise coordinate data representing positions on the map respectively corresponding to guiding spots, and
   said display control means includes means for displaying the guiding spots respectively corresponding to positions on the map displayed by said display means in accordance with said coordinate data.

3. An apparatus for displaying a map with guiding spots, comprising:
   storage means for storing a plurality of guiding spot data, said data grouped into a plurality of classifications, and data within each said classification being prioritized in an order of highest priority to lowest priority;
   operating means for selecting:
   (a) a designation related to the number of guiding spots to be displayed; and
   (b) one of said plurality of classifications;
   display control means, coupled to said storage means and to said operating means, for:
   (a) receiving an indication indicative of said one classification, and a display number indicative of a number of guiding spots to be displayed based upon said designation,
   (b) accessing said storage means to read said display number of guiding spot data from said one classification in order of highest priority data to lower priority data, so that said display number of data read are the highest priority data in said storage means, and
   (c) producing a display indicative of said guiding spot data read; and
   display means, coupled to said display control means, for displaying a map and for displaying said display produced by said display control means superposed on said map.

4. An apparatus as in claim 3 wherein said guiding spot data is prioritized by its order of writing into said storage means.

5. An apparatus as in claim 3, further comprising priority indicative information being written into said storage means.

* * * * *